(12) United States Patent
Khare et al.

(10) Patent No.: US 6,683,024 B1
(45) Date of Patent: Jan. 27, 2004

(54) DESULFURIZATION AND NOVEL SORBENTS FOR SAME

(75) Inventors: Gyanesh P. Khare, Bartlesville, OK (US); Donald R. Engelbert, Copan, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 09/525,588

(22) Filed: Mar. 15, 2000

(51) Int. Cl.[7] .................... B01J 20/02; B01J 20/10; B01J 23/00; B01J 23/32; B01J 23/58; B01J 21/08; B01J 21/12; B01J 21/14; B01J 23/60

(52) U.S. Cl. .................. 502/400; 502/406; 502/407; 502/415; 502/355; 502/354; 502/348; 502/346; 502/343; 502/342; 502/338; 502/337; 502/336; 502/335; 502/332; 502/331; 502/330; 502/329; 502/327; 502/324; 502/323; 502/321; 502/318; 502/317; 502/316; 502/315; 502/314; 502/313; 502/312; 502/311; 502/310; 502/307; 502/263; 502/260; 502/259; 502/258; 502/255; 502/254; 502/253; 502/249; 502/248; 502/247; 502/246; 502/245; 502/244; 502/243; 502/242; 502/241

(58) Field of Search ............... 502/400, 406, 502/407, 415, 307, 310–318, 321–324, 327, 329–332, 335–338, 342, 343, 346, 348, 354, 355, 241–249, 253, 254, 255, 258–260, 263

(56) References Cited

U.S. PATENT DOCUMENTS

| | | | | |
|---|---|---|---|---|
| 4,089,809 A | * | 5/1978 | Farrior, Jr. .................. 252/459 |
| 4,193,894 A | * | 3/1980 | Villadsen ................... 252/440 |
| 4,255,253 A | | 3/1981 | Herrington et al. ..... 208/216 PP |
| 4,397,964 A | | 8/1983 | Pargeter et al. ............. 518/713 |
| 4,547,486 A | | 10/1985 | Shyr .......................... 502/333 |
| 4,729,889 A | * | 3/1988 | Flytani-Stephanopoulos et al. ........................... 423/593 |
| 5,244,641 A | * | 9/1993 | Khare ........................ 423/220 |
| 5,254,516 A | * | 10/1993 | Gupta et al. ................... 502/84 |
| 5,306,685 A | * | 4/1994 | Khare ........................ 502/253 |
| 5,439,867 A | | 8/1995 | Khare et al. ................ 502/407 |
| 5,710,083 A | * | 1/1998 | Khare ......................... 502/25 |
| 5,710,089 A | * | 1/1998 | Khare ........................ 502/407 |
| 5,710,091 A | * | 1/1998 | Khare ........................ 502/414 |
| 5,714,431 A | * | 2/1998 | Gupta et al. ................. 502/400 |
| 5,726,117 A | * | 3/1998 | Khare et al. ................ 502/400 |
| 5,780,001 A | * | 7/1998 | Khare et al. ................ 423/230 |
| 5,958,830 A | * | 9/1999 | Khare et al. ................ 502/407 |
| 5,972,835 A | * | 10/1999 | Gupta ........................ 502/439 |
| 6,150,300 A | * | 11/2000 | Khare et al. ................ 502/407 |
| 6,254,766 B1 | * | 7/2001 | Sughrue et al. ............. 208/244 |
| 6,271,173 B1 | * | 8/2001 | Khare ........................ 502/406 |
| 6,274,533 B1 | * | 8/2001 | Khare ........................ 502/343 |
| 6,432,873 B1 | * | 8/2002 | Khare et al. ................ 502/406 |

* cited by examiner

*Primary Examiner*—Cam N. Nguyen
(74) *Attorney, Agent, or Firm*—Lynda S. Jolly; Bronwyn A. Welvaert

(57) ABSTRACT

A sorbent composition is provided which can be used in the desulfurization of a hydrocarbon-containing fluid such as cracked gasoline or diesel fuel. The sorbent composition contains a support component and a promoter component with the promoter component being present as a skin on the support component. Such sorbent composition is prepared by a process of impregnating a support component with a promoter component, wherein the promoter component has been melted under a melting condition, followed by drying, calcining, and reducing to thereby provide the sorbent composition.

86 Claims, No Drawings

DESULFURIZATION AND NOVEL SORBENTS FOR SAME

BACKGROUND OF THE INVENTION

This invention relates to a sorbent composition, a process of making a sorbent composition, and to a process of using a sorbent composition for the removal of sulfur from a hydrocarbon-containing fluid.

The need for cleaner burning fuels has resulted in a continuing world-wide effort to reduce sulfur levels in hydrocarbon-containing fluids such as gasoline and diesel fuels. The reduction of sulfur in such hydrocarbon-containing fluids is considered to be a means for improving air quality because of the negative impact the sulfur has on the performance of sulfur-sensitive items such as automotive catalytic converters. The presence of oxides of sulfur in automotive engine exhaust inhibits and may irreversibly poison noble metal catalysts in the converter. Emissions from an inefficient or poisoned converter contain levels of non-combusted, non-methane hydrocarbons, oxides of nitrogen, and carbon monoxide. Such emissions are catalyzed by sunlight to form ground level ozone, more commonly referred to as smog.

Most of the sulfur in a hydrocarbon-containing fluid such as gasoline comes from thermally processed gasolines. Thermally processed gasolines such as, for example, thermally cracked gasoline, visbreaker gasoline, coker gasoline and catalytically cracked gasoline (hereinafter collectively referred to as "cracked-gasoline") contains, in part, olefins, aromatics, sulfur, and sulfur-containing compounds.

Since most gasolines, such as for example automobile gasolines, racing gasolines, aviation gasolines, boat gasolines, and the like contain a blend of, at least in part, cracked-gasoline, reduction of sulfur in cracked-gasoline will inherently serve to reduce the sulfur levels in most gasolines such as, for example, automobile gasolines, racing gasolines, aviation gasolines, boat gasolines, and the like.

The public discussion about gasoline sulfur has not centered on whether or not sulfur levels should be reduced. A consensus has emerged that lower sulfur gasoline reduces automotive emissions and improves air quality. Thus, the real debate has focused on the required level of reduction, the geographical areas in need of lower sulfur gasoline, and the time frame for implementation.

As the concern over the impact of automotive air pollution continues, it is clear that further efforts to reduce the sulfur levels in hydrocarbon-containing fluids such as gasolines, more particularly automotive gasolines, will be required. While the current automotive gasoline products contain about 330 parts per million (ppm) sulfur by weight, the U.S. Environmental Protection Agency recently issued regulations requiring the average sulfur content in gasolines to be less than 30 ppm average with an 80 ppm maximum. By 2006, the standards will effectively require every blend of gasoline sold in the United States to meet the 30 ppm level.

In addition to the need to be able to produce low sulfur content automotive fuels, there is also a need for a process which will have a minimal effect on the olefin content of such fuels so as to maintain the octane number (both research and motor octane number). Such a process would be desirable since saturation of olefins greatly affects the octane number. Such adverse effect on olefin content is generally due to the severe condition normally employed, such as during hydrodesulfurization, to remove thiophenic compounds (such as, for example, thiophenes, benzothiophenes, alkyl thiophenes, alkylbenzothiophenes, alkyl dibenzothiophenes and the like) which are some of the most difficult sulfur-containing compounds to be removed from cracked-gasoline. In addition, there is a need to avoid a system wherein the conditions are such that the aromatic content of the cracked-gasoline is also lost through saturation. Thus, there is a need for a process wherein desulfurization is achieved and the octane number is maintained.

In addition to the need for removal of sulfur from hydrocarbon-containing fluids such as cracked-gasoline, there is also presented to the petroleum industry a need to reduce the sulfur content in other hydrocarbon-containing fluids such as diesel fuel including light cycle oils. In removing sulfur from diesel fuel by hydrodesulfurization, the cetane is improved but there is a large cost in hydrogen consumption. Such hydrogen is consumed by both hydrodesulfurization and aromatic hydrogenation reactions.

Thus, there is a need for a process of desulfurization without a significant consumption of hydrogen so as to provide a more economical process for the treatment of hydrocarbon-containing fluids such as cracked gasoline and diesel fuel including light cycle oils.

As a result of the lack of success in providing a successful and economically feasible process for the reduction of sulfur levels in hydrocarbon-containing fluids such as cracked-gasoline and diesel fuel including light cycle oils, it is apparent that there is still a need for a better process for the desulfurization of such hydrocarbon-containing fluids which has minimal effect on octane levels while achieving high levels of sulfur removal.

Further, prior art processes to produce compositions containing promoter components generally involve adding the promoter components by spray impregnation techniques which utilize an aqueous or non-aqueous solvent such as water. Such spray impregnation techniques are costly and time-consuming. Consequently, a process to produce a sorbent composition which involves adding a promoter component(s) without utilizing a spray impregnation technique or substantial quantities of an aqueous or non-aqueous solvent such as water would be of significant contribution to the art and to the economy.

SUMMARY OF THE INVENTION

An object of the present invention is to provide a sorbent composition that can be used for the removal of sulfur from a hydrocarbon-containing fluid such as cracked-gasoline or diesel fuel including light cycle oils.

Another object of the present invention is to provide a sorbent composition comprising a promoter component selected from the group consisting of metals, metal oxides, and the like and combinations thereof distributed as a "skin" on the sorbent composition.

Yet another object of the present invention is to provide a sorbent composition having a reduced amount of metal or metal oxide components exhibiting a high reactivity to remove sulfur from hydrocarbon-containing fluids compared to a sorbent composition having a greater amount of such metal or metal oxide components.

Still another object of the present invention is to provide a method of making a novel sorbent composition which is useful in the desulfurization of a hydrocarbon-containing fluid such as cracked-gasoline or diesel fuel including light cycle oils.

Still yet another object of the present invention is to provide a method of making a novel sorbent composition which is useful in the desulfurization of a hydrocarbon-containing fluid, such as cracked-gasoline or diesel fuel including light cycle oils, which does not involve a spray impregnation technique, such as a spray impregnation technique which utilizes an aqueous or non-aqueous solvent such as water, when adding a promoter component(s) to such composition(s).

A further object of the present invention is to employ such novel sorbent composition(s) and a process(es) for the removal of sulfur, such as that found in sulfur-containing compounds, from a hydrocarbon-containing fluid, such as cracked-gasoline or diesel fuel including light cycle oils, which minimizes the consumption of hydrogen and minimizes the saturation of olefins and aromatics contained in such hydrocarbon-containing fluid.

A still further object of the present invention is to provide a desulfurized cracked-gasoline that contains less than about 100 parts per million of sulfur based on the weight of the desulfurized cracked-gasoline and which contains essentially the same amount of olefins and aromatics as are in the cracked-gasoline from which such desulfurized cracked-gasoline was made.

The present invention is based upon our discovery that through the utilization of a "skin" distribution of a promoter component, selected from the group consisting of metals, metal oxides, and the like and combinations thereof, in a substantially reduced valence state, preferably a zero valence state, onto a sorbent composition there is achieved a novel sorbent composition which permits the ready removal of sulfur from hydrocarbon-containing fluids such as cracked-gasoline and diesel fuel including light cycle oils with a minimal effect on the octane rating of the treated hydrocarbon-containing fluid.

In one aspect of the present invention there is provided a novel sorbent composition(s) suitable for the desulfurization of a hydrocarbon-containing fluid, such as cracked-gasoline or diesel fuel including light cycle oils. Such novel sorbent composition(s) comprises a support component and a "skin-distributed" promoter component selected from the group consisting of metals, metal oxides, and the like and combinations thereof wherein the valance of such promoter component, distributed as a skin, is substantially reduced and such reduced-valence skin-distributed promoter component is present in an amount which is effective in the removal of sulfur from a hydrocarbon-containing fluid.

In accordance with another aspect of the present invention, there is provided a process(es) for the preparation of a novel sorbent composition(s) which comprises: contacting components of a support component, preferably such support component comprises zinc oxide, silica, and alumina, to form a mixture selected from the group consisting of a wet mix, a dough, a paste, a slurry, and the like; particulating such mixture so as to form a particulate selected from the group consisting of a granule, an extrudate, a tablet, a sphere, a pellet, a microsphere, and the like; drying such particulate to form a dried particulate; calcining such dried particulate to form a calcined particulate; distributing a promoter component selected from the group consisting of metals, metal oxides, and the like and combinations thereof as a skin upon such dried and calcined particulate to form a promoted particulate; drying such promoted particulate to form a dried promoted particulate; calcining such dried promoted particulate to form a calcined promoted particulate; and reducing such calcined promoted particulate with a suitable reducing agent, such as hydrogen, so as to produce a sorbent composition having a substantially reduced-valence promoter component distributed as a skin on such sorbent composition in an amount which is effective in removing sulfur from a hydrocarbon-containing fluid. Such process of distributing a promoter component as a skin upon such dried and calcined particulate utilizes a novel melting method which does not require the use of a substantial quantity of an aqueous or non-aqueous solvent such as water.

In accordance with a further aspect of the present invention, there is provided a process(es) for the desulfurization of a hydrocarbon-containing fluid selected from the group consisting of cracked-gasoline, diesel fuel, light cycle oils and the like and combinations thereof which comprises desulfurizing in a desulfurization zone such hydrocarbon-containing fluid with a sorbent composition, separating the desulfurized hydrocarbon-containing fluid from the resulting sulfurized sorbent composition, regenerating at least a portion of the resulting sulfurized sorbent composition to produce a regenerated, desulfurized sorbent composition; activating at least a portion of the regenerated, desulfurized sorbent composition to produce an activated, regenerated, desulfurized sorbent composition; and thereafter returning at least a portion of the activated, regenerated, desulfurized sorbent composition(s) to the desulfurization zone.

Other objectives and advantages of the present invention will be apparent from the detailed description of the invention and the appended claims.

DETAILED DESCRIPTION OF THE INVENTION

The term "gasoline" denotes a mixture of hydrocarbons boiling in the range of from about 100° F. to about 400° F., or any fraction thereof. Examples of suitable gasoline include, but are not limited to, hydrocarbon streams in refineries such as naphtha, straight-run naphtha, coker naphtha, catalytic gasoline, visbreaker naphtha, alkylate, isomerate, reformate, and the like and combinations thereof.

The term "cracked-gasoline" denotes a mixture of hydrocarbons boiling in the range of from about 100° F. to about 400° F., or any fraction thereof, that are products from either thermal or catalytic processes that crack larger hydrocarbon molecules into smaller molecules. Examples of suitable thermal processes include, but are not limited to, coking, thermal cracking, visbreaking and the like and combinations thereof. Examples of suitable catalytic cracking processes include, but are not limited to fluid catalytic cracking, heavy oil cracking, and the like and combinations thereof. Thus, examples of suitable cracked-gasoline include, but are not limited to, coker gasoline, thermally cracked gasoline, visbreaker gasoline, fluid catalytically cracked gasoline, heavy oil cracked gasoline, and the like and combinations thereof. In some instances, the cracked-gasoline may be fractionated and/or hydrotreated prior to desulfurization when used as a hydrocarbon-containing fluid in a process(es) of the present invention.

The term "diesel fuel" denotes a mixture of hydrocarbons boiling in the range of from about 300° F. to about 750° F., or any fraction thereof. Examples of suitable diesel fuels include, but are not limited to, light cycle oil, kerosene, jet fuel, straight-run diesel, hydrotreated diesel, and the like and combinations thereof.

The term "sulfur" denotes sulfur in any form such as elemental sulfur or a sulfur compound normally present in a hydrocarbon-containing fluid such as cracked gasoline or diesel fuel. Examples of sulfur which can be present during the desulfurization process(es) disclosed herein, usually contained in a hydrocarbon-containing fluid, include, but are not limited to, hydrogen sulfide, carbonyl sulfide (COS), carbon disulfide (CS$_2$), mercaptans (RSH), organic sulfides (R—S—R), organic disulfides (R—S—S—R), thiophene, substituted thiophenes, organic trisulfides, organic tetrasulfides, benzothiophene, alkyl thiophenes, alkyl benzothiophenes, alkydibenzothiophenes, and the like and combinations thereof as well as the heavier molecular weights of same which are normally present in a diesel fuel of the types contemplated for use in a process(es) of the present invention, wherein each R can be an alkyl or cycloalkyl or aryl group containing one carbon atom to ten carbon atoms.

The term "fluid" denotes gas, liquid, vapor, and combinations thereof.

The term "gaseous" denotes that state in which the hydrocarbon-containing fluid, such as cracked-gasoline or diesel fuel, is primarily in a gas or vapor phase.

The term "skin" denotes the exterior surface of the sorbent composition which can contain a promoter component selected from the group consisting of metals, metal oxides, and the like and combinations thereof. The skin can be any thickness as long as such thickness can promote the desulfurization process(es) disclosed herein. Generally, the thickness of the skin can be in the range of from about 1 micron to about 400 microns, preferably in the range of from about 5 microns to about 300 microns, more preferably in the range of from about 5 microns to about 250 microns, and, most preferably, in the range of from 5 microns to 200 microns. Preferably, the promoter component is concentrated as a skin on the sorbent composition whereas other components of the support component, preferably comprising zinc oxide, silica, and alumina, are distributed throughout the sorbent composition.

The term "support component" denotes any component or combination of such components which can be used as a support for a sorbent composition(s) of the present invention to help promote the desulfurization process(es) disclosed herein. Examples of a suitable support component include, but are not limited to, zinc oxide and any suitable inorganic and organic carriers and the like and combinations thereof. Examples of suitable inorganic carriers include, but are not limited to, silica, silica gel, alumina, clays such as attapulgus clay, china clay, diatomaceous earth, kaolin, kieselguhr, aluminum silicate, silica-alumina, titania, zirconia, zinc aluminate, zinc titanate, zinc silicate, calcium aluminate, calcium silicate, magnesium silicate, magnesium aluminate, magnesium titanate, synthetic zeolites, natural zeolites, and the like and combinations thereof. Examples of suitable organic carriers include, but are not limited to, activated carbon, coke, charcoal, carbon-containing molecular sieves, and the like and combinations thereof. A preferred support component comprises zinc oxide, silica, and alumina.

The term "promoter component" denotes any component which can be added to a sorbent composition of the present invention to help promote the desulfurization process(es) disclosed herein. Examples of suitable promoter components include, but are not limited to, metals, metal oxides, and the like and combinations thereof.

The term "metal" denotes metal in any form such as elemental metal or a metal-containing compound.

The term "metal oxide" denotes metal oxide in any form such as a metal oxide or a metal oxide precursor.

During the preparation of a sorbent composition(s) of the present invention, the promoter component selected from the group consisting of metals, metal oxides, and the like and combinations thereof may initially be in the form of a metal-containing compound(s) and/or a metal oxide precursor(s). It should be understood that when the promoter component is initially a metal-containing compound(s) and/or a metal oxide precursor(s), a portion of, or all of, such compound(s) and/or precursor(s) may be converted to the corresponding metal or metal oxide of such compound(s) and/or precursor(s) during the inventive process(es) disclosed herein.

The term "reduced-valence promoter component" denotes that a substantial portion of the valence of such promoter component is reduced to a value of less than 3, preferably to a value of zero.

A sorbent composition(s) of the present invention desulfurizes more effectively when the skin is relatively thin (such as the most preferable skin thickness of 5 microns to 200 microns) than when the skin is thicker (such as greater than 400 microns). Thus, there is a significant benefit, better or more desulfurization, by preparing a sorbent composition with a thin skin, rather than a thick skin. Further, there is significant benefit, better or more desulfurization, by preparing a sorbent composition with a skin than a sorbent composition without a skin.

One can use any suitable method(s) or manner known in the art to determine the concentration of the promoter component in the skin of the sorbent composition. Determining the concentration of the promoter component in the skin of the sorbent composition also helps in determining the thickness of the skin. One technique currently favored is the electron microprobe which is known to one skilled in the art.

The present invention is based upon the discovery of applicants that a reduced-valence promoter component distributed as a skin on a particulate composition comprising a support component, preferably such support component comprises zinc oxide, silica, and alumina, results in a sorbent composition which permits the removal of sulfur from a hydrocarbon-containing fluid, such as cracked-gasoline or diesel fuels, without having a significant adverse effect on the olefin content of such treated hydrocarbon-containing fluid, thus avoiding a significant reduction in octane values of such treated hydrocarbon-containing fluid. Moreover, the use of a novel sorbent composition(s) of the present invention results in a significant reduction of the sulfur content of the treated hydrocarbon-containing fluid.

When a support component generally comprising zinc oxide and any inorganic or organic carrier, preferably comprising zinc oxide, silica and alumina, is used, the zinc oxide used in the preparation of a sorbent composition of the present invention can either be in a form of zinc oxide such as powdered zinc oxide, or in the form of one or more zinc compounds that are convertible to zinc oxide under the conditions of preparation described herein. Examples of suitable zinc compounds include, but are not limited to, zinc sulfide, zinc sulfate, zinc hydroxide, zinc carbonate, zinc acetate, zinc nitrate, and the like and combinations thereof. Preferably, the zinc oxide is in the form of powdered zinc oxide.

When a preferred support component comprising zinc oxide, silica, and alumina is used, the silica used in the preparation of a sorbent composition of the present invention may be either in the form of silica or in the form of one or more silicon compounds. Any suitable type of silica may be employed in preparing a sorbent composition of the present invention. Examples of suitable types of silica include, but are not limited to, diatomite, silicalite, silica colloid, flame-hydrolyzed silica, hydrolyzed silica, silica gel, precipitated silica and the like and combinations thereof, with diatomite being presently preferred. In addition, silicon compounds that are convertible to silica such as silicic acid, sodium silicate, ammonium silicate and the like and combinations thereof can also be employed. Preferably, the silica is in the form of diatomite.

When a preferred support component comprising zinc oxide, silica, and alumina is used, the alumina used in preparing a sorbent composition of the present invention can be any suitable commercially available alumina material including, but not limited to, colloidal alumina solutions and, generally, those alumina compounds produced by the dehydration of alumina hydrates.

The promoter component used in preparing a sorbent composition of the present invention can be any metal, metal oxide, and the like and combinations thereof in any form which is effective in desulfurizing a hydrocarbon-containing fluid according to a process(es) disclosed herein. Generally such promoter component is selected from the group consisting of metals, metal oxides, and the like and combinations thereof including compounds which contain such metals and metal oxides. Examples of suitable metals include, but are not limited to, cobalt, nickel, iron, manganese, copper, zinc, molybdenum, tungsten, silver, tin, vanadium, antimony, and the like and combinations thereof. Examples of suitable metal oxides include, but are not limited to, cobalt oxides, nickel oxides, iron oxides, manganese oxides, copper oxides, zinc oxides, molybdenum oxides, tungsten oxides, silver oxides, tin oxides, vanadium oxides, antimony oxides, and the like and combinations thereof. Generally such metals are contained in metal-containing compounds which can be used to distribute the metal of such metal-containing compounds as a skin on the surface of a dried and calcined particulate material to thereby form a dried and calcined promoted particulate material which can then be further dried and calcined, and preferably reduced, to thereby form a sorbent composition of the present invention.

Some examples of the form which such metals can be in include, but are not limited to, metal acetates, metal carbonates, metal nitrates, metal sulfates, metal thiocyanates, and the like and combinations thereof. Preferably, the promoter component is selected from the group consisting of nickel, cobalt, and the like and combinations thereof. More preferably, the promoter component is nickel. In a preferred method of making process of the present invention, the sorbent composition is promoted with a precursor of a nickel oxide such as nickel nitrate, more preferably nickel nitrate hexahydrate.

When the support component comprises zinc oxide and any inorganic or organic carrier, preferably comprising zinc oxide, silica and alumina, the zinc oxide will generally be present in the sorbent composition in an amount in the range of from about 10 to about 90 weight percent zinc oxide based on the total weight of the sorbent composition, preferably in an amount in the range of from about 15 to about 60 weight percent zinc oxide and, more preferably, in an amount in the range of from 20 to 55 weight percent zinc oxide.

When the support component comprises the preferred support component comprising zinc oxide, silica, and alumina, the silica will generally be present in the sorbent composition in an amount in the range of from about 5 to about 85 weight percent silica based on the total weight of the sorbent composition, preferably in an amount in the range of from about 20 to about 60 weight percent silica and, more preferably, in an amount in the range of from 25 to 55 weight percent silica.

When the support component comprises the preferred support component comprising zinc oxide, silica, and alumina, the alumina will generally be present in the sorbent composition in an amount in the range of from about 5 to about 30 weight percent alumina based on the total weight of the sorbent composition, preferably in an amount in the range of from about 5 to about 20 weight percent alumina and, more preferably, in an amount in the range of from 5 to 15 weight percent alumina.

The promoter component will generally be present in the sorbent composition in an amount in the range of from about 5 to about 50 weight percent promoter component based on the total weight of the sorbent composition, preferably in an amount in the range of from about 8 to about 40 weight percent promoter component and, more preferably, in an amount in the range of from 10 to 30 weight percent promoter component. When the promoter component comprises a combination of metals, metal oxides, and the like, such as a preferred bimetallic promoter component, the bimetallic promoter component should comprise a weight ratio of the two metals forming such bimetallic promoter component in the range of from about 20:1 to about 1:20. In a preferred embodiment of the present invention, the promoter component is a bimetallic promoter component comprising nickel and cobalt in a weight ratio of about 1:1.

In the manufacture of a sorbent composition of the present invention, the support component is generally prepared by combining the components of the support component, generally zinc oxide and any inorganic or organic carrier, preferably zinc oxide, silica and alumina, together in appropriate proportions by any suitable method(s) or manner which provides for the intimate mixing of such components to thereby provide a substantially homogeneous mixture comprising zinc oxide and any inorganic or organic carrier, preferably a substantially homogeneous mixture comprising zinc oxide, silica and alumina. Any suitable means for mixing the components of the support component, preferably zinc oxide, silica, and alumina, can be used to achieve the desired dispersion of such components. Examples of suitable means for mixing include, but are not limited to, mixing tumblers, stationary shells or troughs, Muller mixers, which are of the batch or continuous type, impact mixers, and the like. It is presently preferred to use a Muller mixer as the means for mixing the components of the support component, preferably comprising zinc oxide, silica, alumina.

The components of the support component, generally zinc oxide and any inorganic or organic carrier, preferably zinc oxide, silica and alumina, are mixed to provide a resulting mixture which can be in a form selected from the group consisting of wet mix, dough, paste, slurry and the like. Such resulting mixture can then be shaped to form a particulate(s) selected from the group consisting of a granulate, an extrudate, a tablet, a sphere, a pellet, or a micro-sphere. For example, if the resulting mixture is in the form of a wet mix, the wet mix can be densified, dried under a drying condition as disclosed herein, calcined under a calcining condition as disclosed herein, and thereafter shaped, or particulated, through the granulation of the densified, dried, calcined mix to form granulates. Also for example, when the mixture of the components of the support component, generally zinc oxide and any inorganic or organic carrier, preferably zinc oxide, silica and alumina, results in a form of a mixture which is either in a dough state or paste state, such mixture can be then be shaped, preferably extruded, to form a particulate, preferably cylindrical extrudates having a diameter in the range of from about 1/32 inch to 1/2 inch and any suitable length, preferably a length in the range of from about ⅛ inch to about 1 inch. The resulting particulates, preferably cylindrical extrudates, are then dried under a drying condition as disclosed herein and then calcined under a calcining condition as disclosed herein. Also for example, when the mix is in the form of a slurry, the particulation of such slurry is achieved by spray drying the slurry to form micro-spheres thereof having a size in the range of from about 20 to about 500 microns. Such micro-spheres are then subjected to drying under a drying condition as disclosed herein and calcining under a calcining condition as disclosed herein.

The resulting support component, preferably a particulated, dried, and calcined support component, generally comprising zinc oxide and any inorganic or organic carrier, preferably comprising zinc oxide, silica and alumina, is then incorporated with a promoter component selected from the group consisting of metals, metal oxides, and the like and combinations thereof including compounds containing such metals and metal oxides, preferably a nickel oxide compound or a nickel oxide precursor or a bimetallic promoter component comprising a nickel oxide compound, or a nickel oxide precursor, and a cobalt oxide compound or a cobalt oxide precursor.

Following the incorporating of the support component, preferably a particulated, dried, and calcined support component, generally comprising zinc oxide and any inorganic or organic carrier, preferably comprising zinc oxide, silica and alumina, with a promoter component, the resulting promoted particulates are then subjected to drying under a drying condition as disclosed herein and calcined under a calcining condition as disclosed herein to thereby provide dried, calcined, promoted particulates prior to the subjecting of such dried, calcined, promoted particulates to reduction with a reducing agent, preferably hydrogen.

The promoter component(s) may be incorporated onto the support component, preferably a particulated, dried, and calcined support component, generally comprising zinc oxide and any inorganic or organic carrier, preferably comprising zinc oxide, silica and alumina, by any suitable means or method(s) for incorporating the promoter component(s) as a skin onto a substrate material, such as the dried and calcined particulates, which results in the formation of a promoted sorbent composition which can then be dried under a drying condition as disclosed herein and calcined under a calcining condition as disclosed herein to thereby provide dried, calcined, promoted particulates. The dried, calcined, promoted particulates can then be subjected to reduction with a reducing agent, preferably hydrogen, to thereby provide a sorbent composition of the present invention.

A preferred method for incorporating a promoter component as a skin onto the support component, preferably a particulated, dried, and calcined support component (i.e., particulates), generally comprising zinc oxide and any inorganic or organic carrier, preferably comprising zinc oxide, silica and alumina, is to impregnate such particulates with a promoter component, initially in the form of a metal-containing compound, which has been melted under a melting condition as described herein. Preferably such promoter component is initially in the form of a metal-containing compound such as a metal salt, such as, but not limited to, a metal chloride, a metal nitrate, a metal sulfate, and the like and combinations thereof (such as, but not limited to, nickel nitrate hexahydrate). Addition of small amounts of an aqueous or nonaqueous solvent, such as water, to the promoter component can be used to assist in the melting of such promoter component, but such use of a solvent is not required.

Such melting condition includes a temperature in a range of from the melting point of the promoter component to below the decomposition temperature of the promoter component for a time period and at a pressure that provides for a melted promoter component. The term "decomposition temperature" refers to the temperature at which the promoter component is no longer soluble and is no longer suitable for incorporating, preferably impregnating, the promoter component as a skin onto the support component according to the inventive process(es) disclosed herein.

The temperature of such melting condition varies depending on the promoter component but such temperature should be such as to provide a melted promoter component. Such temperature is generally in the range of from about 75° F. to about 700° F., preferably in the range of from about 85° F. to about 300° F., more preferably in the range of from about 95° F. to about 280° F. and, most preferably, in the range of from 95° F. to 250° F.

Such melting condition can include a time period generally in the range of from about 1 minute to about 2 hours, preferably in the range of from about 5 minutes to about 1.5 hours and, most preferably, in the range of from 5 minutes to 1 hour. Such melting condition can include a pressure generally in the range of from about atmospheric (i.e., about 14.7 pounds per square inch absolute) to about 150 pounds per square inch absolute (psia), preferably in the range of from about atmospheric to about 100 psia, most preferably about atmospheric, so long as the desired temperature can be maintained.

The thus-melted promoter component is then used to incorporate, preferably impregnate, such promoter component as a skin onto the support component, preferably a particulated, dried and calcined support component (i.e., particulates), generally comprising zinc oxide and any inorganic or organic carrier, preferably comprising zinc oxide, silica and alumina, prepared according to the process(es) disclosed herein. The melted promoter component is incorporated, preferably impregnated, onto the support component, preferably particulates, by any manner or method(s) which results in substantially all the surface area of the particulates being contacted with the melted promoter component resulting in a skin distribution of the promoter component. The phrase "substantially all the surface area of the particulates being contacted with the melted promoter component" generally refers to greater than twenty-five percent of the surface area of the particulates, preferably greater than forty percent of the surface area of the particulates, more preferably greater than sixty percent of the surface area of the particulates, and most preferably greater than ninety-five percent of the surface area of the particulates being contacted with the melted promoter component.

An example method of incorporating, preferably impregnating, a melted promoter component as a skin onto the support component, preferably a particulated, dried and calcined support component (i.e., particulates), is by mixing a solid promoter component (i.e., an unmelted promoter component) with the particulates by any manner or method(s) which results in a mixture of particulates and solid promoter component. The mixture of particulates and solid promoter component is then subjected to a melting condition as described herein, preferably while such mixture is subjected to constant stirring or tumbling, which results in substantially all the surface area of the particulates being contacted with a melted promoter component resulting in a skin distribution of the promoter component.

A preferred method of incorporating, preferably impregnating, a melted promoter component onto the support component, preferably a particulated, dried and calcined support component (i.e., particulates), is by pre-heating the particulates under a heating condition as described herein to thereby provide a pre-heated support component (i.e., pre-heated particulates) followed by contact with a solid promoter component (i.e., an unmelted promoter component) which results in a melting of the solid promoter component upon contact with the pre-heated particulates which further results in substantially all the surface area of the particulates being contacted with the melted promoter component, i.e., a skin distribution of the promoter component. Preferably such pre-heated particulates are under constant stirring or tumbling during contact with the promoter component. Such mixture of particulates and melted promoter component can be further heated near the melting point of the promoter component for a time period in the range of from about 0.5 hour to about 15 hours, preferably in the range of from about 1 hour to about 8 hours and, most preferably, in the range of from 1 hour to 5 hours to further aid in the melting of the promoter component.

Such heating condition, suitable for pre-heating the support component, preferably a particulated, dried and calcined support component (i.e., particulates), can include a temperature generally in the range of from about 175° F. to about 300° F., preferably in the range of from about 185° F. to about 280° F. and, most preferably, in the range of from 190° F. to 260° F. Such heating condition can include a time period generally in the range of from about 1 minute to about 2 hours, preferably in the range of from about 5 minutes to about 1.5 hours and, most preferably, in the range of from 5 minutes to 1 hour. Such heating condition can include a pressure generally in the range of from about atmospheric (i.e., about 14.7 pounds per square inch absolute) to about 150 pounds per square inch absolute (psia), preferably in the range of from about atmospheric to about 100 psia, most preferably about atmospheric, so long as the desired temperature can be maintained.

Another preferred method of incorporating, preferably impregnating, a melted promoter component onto the support component, preferably a particulated, dried and calcined support component (i.e., particulates), is by subjecting a solid promoter component to a melting condition as described herein to thereby provide a melted promoter component which has become viscous enough to pour. The particulates are then contacted with such melted promoter component by pouring such melted promoter component onto the surface of the particulates by any manner or method(s) which results in substantially all the surface area of the particulates being contacted with the melted promoter component resulting in a skin distribution of the promoter component. Preferably, such melted promoter component is poured onto the surface of the particulates while such particulates are under constant stirring or tumbling. It can be desirable to pre-heat the support component, preferably a particulated, dried and calcined support component (i.e., particulates), under a heating condition as described herein before contact with the melted promoter component.

In an example method, solid nickel nitrate hexahydrate is used to incorporate, preferably impregnate, the nickel of such solid nickel nitrate hexahydrate as a skin onto the support component, preferably a particulated, dried and calcined support component comprising zinc oxide, silica, and alumina (i.e., particulates). The nickel of such solid nickel nitrate hexahydrate is incorporated, preferably impregnated, as a skin onto the particulates by mixing such solid nickel nitrate hexahydrate with the particulates by any manner or method(s) which results in a mixture of solid nickel nitrate hexahydrate and particulates and then subjecting such mixture, while under constant stirring or tumbling, to a melting condition as described herein with results in substantially all the surface area of the particulates being contacted with melted nickel nitrate hexahydrate resulting in a skin distribution of the nickel nitrate hexahydrate. In addition, cobalt nitrate hexahydrate or iron nitrate nonahydrate or manganese nitrate hexahydrate or copper nitrate or zinc nitrate hexahydrate or silver nitrate or the like and combinations thereof can be used in place of nickel nitrate hexahydrate to incorporate, preferably impregnate, the metal of such metal-containing compound(s) as a skin onto the particulates in the same above-described manner as for incorporating, preferably impregnating, the nickel of such nickel nitrate hexahydrate. Also preferred, solid nickel nitrate hexahydrate and solid cobalt nitrate hexahydrate are mixed with the particulates and then the resulting mixture, while under constant stirring or tumbling, is subjected to a melting condition as described herein to incorporate, preferably impregnate, the nickel and cobalt as a skin onto the particulates. After drying and calcining, a sorbent composition comprising a bimetallic promoter component comprising nickel and cobalt is formed.

In a most preferred method, solid nickel nitrate hexahydrate is used to incorporate, preferably impregnate, the nickel of such solid nickel nitrate hexahydrate as a skin onto the particulated, dried and calcined support component comprising zinc oxide, silica, and alumina (i.e., particulates). The nickel of such solid nickel nitrate hexahydrate is incorporated, preferably impregnated, as a skin onto the particulates by contacting such particulates, which have been pre-heated under a heating condition as described herein, with the solid nickel nitrate hexahydrate while under constant stirring or tumbling which results in a melting of the solid nickel nitrate hexahydrate upon contact with the pre-heated particulates which results in substantially all the surface area of the pre-heated particulates being contacted with melted nickel nitrate hexahydrate resulting in a skin distribution of the nickel nitrate hexahydrate. In addition, cobalt nitrate hexahydrate or iron nitrate nonahydrate or manganese nitrate hexahydrate or copper nitrate or zinc nitrate hexahydrate or silver nitrate or the like and combinations thereof can be used in place of nickel nitrate hexahydrate to incorporate, preferably impregnate, the metal of such metal-containing compound(s) as a skin onto the pre-heated particulates in the same above-described manner as for incorporating, preferably impregnating, the nickel of such nickel nitrate hexahydrate. Also, solid nickel nitrate hexahydrate and solid cobalt nitrate hexahydrate can be contacted with the pre-heated particulates while under constant stirring or tumbling to incorporate, preferably impregnate, the nickel and cobalt as a skin onto the particulates. After drying and calcining, a sorbent composition comprising a bimetallic promoter component comprising nickel and cobalt is formed.

In another most preferred method, solid nickel nitrate hexahydrate is subjected to a melting condition to thereby provide a melted nickel nitrate hexahydrate which is viscous enough to pour. The resulting melted nickel nitrate hexahydrate is then used to incorporate, preferably impregnate, the nickel of such melted nickel nitrate hexahydrate as a skin onto the particulated, calcined support component comprising zinc oxide, silica, and alumina (i.e., particulates) which have been pre-heated under a heating condition as described herein. The nickel of such melted nickel nitrate hexahydrate is incorporated, preferably impregnated as a skin onto the pre-heated particulates by adding such melted nickel nitrate hexahydrate to the pre-heated particulates by pouring such melted nickel nitrate hexahydrate onto the surface of the pre-heated particulates by any manner or method(s) which results in substantially all the surface area of the particulates being contacted with the melted nickel nitrate hexahydrate resulting in a skin distribution of the nickel nitrate hexahydrate. Preferably, such melted nickel nitrate hexahydrate is poured onto the surface of the pre-heated particulates while such particulates are under constant stirring or tumbling. In addition, cobalt nitrate hexahydrate or iron nitrate nonahydrate or manganese nitrate hexahydrate or copper nitrate or zinc nitrate hexahydrate or silver nitrate or the like and combinations thereof can be used in place of nickel nitrate hexahydrate to incorporate, preferably impregnate, the metal of such metal-containing compound(s) as a skin onto the pre-heated particulates in the same above-described manner as for incorporating, preferably impregnating, the nickel of such nickel nitrate hexahydrate. Also, melted nickel nitrate hexahydrate and melted cobalt nitrate hexahydrate can be poured onto the surface of the pre-heated particulates while such particulates are under constant stirring or tumbling. After drying and calcining, a sorbent composition comprising a bimetallic promoter component comprising nickel and cobalt is formed.

Generally, the amount of promoter component, preferably a melted promoter component, incorporated, preferably impregnated, as a skin onto the support component, preferably a particulated, dried and calcined support component comprising zinc oxide, silica, and alumina prepared according to the process(es) disclosed herein, is an amount which provides, after the promoted particulate material has been dried under a drying condition as disclosed herein and calcined under a calcining condition as disclosed herein, a sorbent composition having an amount of promoter component as disclosed herein.

Generally, a drying condition, as referred to herein, can include a temperature in the range of from about 180° F. to about 290° F., preferably in the range of from about 190° F. to about 280° F. and, more preferably, in the range of from 200° F. to 270° F. Such drying condition can also include a time period generally in the range of from about 0.5 hour to about 60 hours, preferably in the range of from about 1 hour to about 40 hours and, more preferably, in the range of from 1.5 hours to 20 hours. Such drying condition can also include a pressure generally in the range of from about atmospheric (i.e., about 14.7 pounds per square inch absolute) to about 150 pounds per square inch absolute (psia), preferably in the range of from about atmospheric to about 100 psia, more preferably about atmospheric, so long as the desired temperature can be maintained. Any drying method(s) known to one skilled in the art such as, for example, air drying, heat drying, and the like and combinations thereof can be used.

Generally, a calcining condition, as referred to herein, can include a temperature in the range of from about 400° F. to about 1800° F., preferably in the range of from about 600° F. to about 1600° F. and, more preferably, in the range of from 800° F. to about 1500° F. Such calcining condition can also include a pressure, generally in the range of from about 7 pounds per square inch absolute (psia) to about 750 psia, preferably in the range of from about 7 psia to about 450 psia and, more preferably, in the range of from 7 psia to 150 psia, and a time period generally in the range of from about 1 hour to about 60 hours, preferably for a time period in the range of from about 2 hours to about 20 hours and, more preferably, for a time period in the range of from 3 hours to 15 hours.

Once the promoter component, preferably comprising nickel resulting from the use of melted nickel nitrate hexahydrate, has been distributed as a skin onto the support component, preferably a particulated, dried and calcined support component comprising zinc oxide, silica, and alumina, the desired reduced-valence promoter component sorbent, preferably reduced-valence nickel sorbent, is prepared by drying the resulting composition under a drying condition as disclosed herein followed by calcining under a calcining condition as disclosed herein to thereby provide a dried, calcined, promoted particulate(s). The dried, calcined, promoted particulates are thereafter subjected to reduction with a suitable reducing agent, preferably hydrogen, so as to produce a composition having a skin-distributed reduced-valence promoter component, preferably a skin-distributed zero-valence promoter component, with such zero-valence promoter component, preferably zero-valence nickel, being present in an amount sufficient to permit the removal of sulfur from a hydrocarbon-containing fluid such as cracked-gasoline or diesel fuel, according to a process(es) disclosed herein.

A sorbent composition having a skin-distributed reduced-valence promoter component of the present invention is a composition that has the ability to react chemically and/or physically with sulfur. It is also preferable that the sorbent composition removes diolefins and other gum-forming compounds from cracked-gasoline.

A sorbent composition having a reduced-valence promoter component of the present invention comprises a promoter component, preferably comprising nickel, distributed as a skin that is in a substantially reduced valence state, preferably a zero valence state. Preferably, the reduced-valence promoter component is reduced nickel. The amount of reduced-valence promoter component, preferably reduced nickel, in a sorbent composition(s) of the present invention is an amount which will permit the removal of sulfur from a hydrocarbon-containing fluid such as cracked-gasoline or diesel fuel. Such amount(s) of reduced-valence promoter component, preferably reduced nickel, is generally in the range of from about 5 to about 50 weight percent of the total weight of the sorbent composition. Preferably the reduced-valence promoter component, preferably reduced nickel, is present in an amount in the range of from about 8 to about 40 weight percent of the total weight of the sorbent composition and, more preferably, in an amount in the range of from 10 to 30 weight percent of the total weight of the sorbent composition.

In one presently preferred embodiment of the present invention, the reduced nickel is present as a skin in an amount in the range of from about 10 to 30 weight percent based on the total weight of the sorbent composition and the reduced nickel has been substantially reduced to zero valence.

In another presently preferred embodiment of the present invention, zinc oxide is present in an amount in the range of from about 35 to about 50 weight percent zinc oxide based on the total weight of the sorbent composition, silica is present in an amount in the range of from about 30 to about 40 weight percent silica based on the total weight of the sorbent composition, alumina is present in an amount in the range from about 6 to about 12 weight percent alumina based on the total weight of the sorbent composition, and nickel is present, as a skin, prior to reduction to zero valence in an amount in the range of from about 14 to about 30 weight percent nickel based on the total weight of the sorbent composition.

The sorbent composition(s) of the present invention which are useful in a desulfurization process(es) of the present invention can be prepared by a process comprising:

(a) mixing zinc oxide, silica and alumina so as to form a mixture selected from the group consisting of a wet mix, a dough, a paste, a slurry and the like and combinations thereof;

(b) particulating the mixture to form particulates selected from the group consisting of granules, extrudates, tablets, pellets, spheres, micro-spheres, and the like and combinations thereof;

(c) drying the particulate under a drying condition as disclosed herein to form a dried particulate;

(d) calcining the dried particulate under a calcining condition as disclosed herein to form a calcined particulate;

(e) incorporating, preferably impregnating, the calcined particulate with a promoter component, preferably a melted promoter component, selected from the group consisting of metal, metal oxides, and the like and combinations thereof to form a promoted particulate wherein the promoter component is distributed as a skin on the promoted particulate;

(f) drying the promoted particulate under a drying condition as disclosed herein to form a dried, promoted particulate;

(g) calcining the dried, promoted particulate under a calcining condition as disclosed herein to form a calcined, promoted particulate; and (h) reducing the calcined, promoted particulate with a suitable reducing agent so as to produce a sorbent composition having a skin-distributed reduced-valence promoter component, preferably a skin-distributed reduced-valence nickel, and wherein the reduced-valence promoter component is present in an amount effective for the removal of sulfur from a hydrocarbon-containing fluid such as cracked-gasoline or diesel fuel when such hydrocarbon-containing fluid is contacted with a sorbent composition(s) of the present invention according to a process(es) of the present invention.

A process of using a novel sorbent composition(s) of the present invention to desulfurize a hydrocarbon-containing fluid comprising cracked-gasoline or diesel fuel to provide a desulfurized hydrocarbon-containing fluid comprising desulfurized cracked-gasoline or desulfurized diesel fuel comprises:

(a) desulfurizing, in a desulfurization zone, a hydrocarbon-containing fluid with a sorbent composition(s) of the present invention to thereby provide a desulfurized hydrocarbon-containing fluid and a resulting sulfurized sorbent composition;

(b) separating the desulfurized hydrocarbon-containing fluid from the resulting sulfurized sorbent composition;

(c) regenerating, in a regeneration zone, at least a portion of the sulfurized sorbent composition to thereby provide a regenerated, desulfurized, sorbent composition;

(d) reducing, in an activation zone, at least a portion of the regenerated, desulfurized, sorbent composition to thereby provide a reduced, regenerated, desulfurized sorbent composition and;

(e) returning at least a portion of the reduced, regenerated, desulfurized sorbent composition to the desulfurization zone.

The desulfurizing step (a) of the present invention is carried out under a set of conditions that includes total pressure, temperature, weight hourly space velocity and hydrogen flow. These conditions are such that the sorbent composition can desulfurize the hydrocarbon-containing fluid to produce a desulfurized hydrocarbon-containing fluid and a sulfurized sorbent composition.

In carrying out the desulfurization step of a process of the present invention, it is preferred that the hydrocarbon-containing fluid, preferably cracked-gasoline or diesel fuel, be in a gas or vapor phase. However, in the practice of the present invention it is not essential that the hydrocarbon-containing fluid be totally in a gas or vapor phase.

The total pressure can be in the range of from about 15 pounds per square inch absolute (psia) to about 1500 psia. However, it is presently preferred that the total pressure be in a range of from about 50 psia to about 500 psia.

In general, the temperature should be sufficient to keep the hydrocarbon-containing fluid in essentially a vapor or gas phase. While such temperatures can be in the range of from about 100° F. to about 1000° F., it is presently preferred that the temperature be in the range of from about 400° F. to about 800° F. when treating a cracked-gasoline and in the range of from about 500° F. to about 900° F. when treating a diesel fuel including light cycle oil.

Weight hourly space velocity (WHSV) is defined as the numerical ratio of the rate at which a hydrocarbon-containing fluid is charged to the desulfurization zone in pounds per hour at standard condition of temperature and pressure (STP) divided by the pounds of sorbent composition contained in the desulfurization zone to which the hydrocarbon-containing fluid is charged. In the practice of the present invention, such WHSV should be in the range of from about 0.5 to about 50 $hr^{-1}$, preferably in the range of from about 1 to about 20 $hr^{-1}$. The desulfurizing, also referred to as desulfurization, should be conducted for a time sufficient to effect the removal of sulfur from such hydrocarbon-containing fluid.

In carrying out the desulfurizing step, it is presently preferred that an agent be employed which interferes with any possible chemical or physical reacting of the olefinic and aromatic compounds in the hydrocarbon-containing fluid which is being treated with the sorbent composition. Preferably, such agent is hydrogen.

Hydrogen flow in the desulfurization zone is generally such that the mole ratio of hydrogen to hydrocarbon-containing fluid is the range of from about 0.1 to about 10, preferably in the range of from about 0.2 to about 3.

The desulfurization zone can be any zone wherein desulfurization of a hydrocarbon-containing fluid such as cracked-gasoline, diesel fuel or the like, can take place. The regeneration zone can be any zone wherein desulfurizing or regeneration of a sulfurized sorbent composition can take place. The activation zone can be any zone wherein activation, i.e., reduction, of a regenerated, desulfurized sorbent composition can take place. Examples of suitable zones are fixed bed reactors, moving bed reactors, fluidized bed reactors, transport reactors, reactor vessels and the like.

If desired, during the desulfurization of a hydrocarbon-containing fluid(s) according to a process(es) disclosed herein, diluents such as methane, carbon dioxide, flue gas, nitrogen and the like and combinations thereof can be used. Thus, it is not essential to the practice of a process(es) of the present invention that a high purity hydrogen be employed in achieving the desired desulfurization of a hydrocarbon-containing fluid such as cracked-gasoline or diesel fuel.

It is presently preferred when utilizing a fluidized bed reactor system that a sorbent composition be used having a particulate size in the range of from about 20 to about 1000 micrometers. Preferably, such sorbent composition should have a particulate size in the range of from about 40 to about 500 micrometers. When a fixed bed reactor system is employed for the practice of a desulfurization process(es) of the present invention, the sorbent composition should generally have a particulate size in the range of from about 1/32 inch to about 1/2 inch diameter, preferably in the range of from about 1/32 inch to about 1/4 inch diameter.

It is further presently preferred to use a sorbent composition having a surface area in the range of from about 1 square meter per gram ($m^2/g$) to about 1000 square meters per gram of sorbent composition, preferably in the range of from about $1 m^2/g$ to about 800 $m^2/g$.

The separation of the desulfurized hydrocarbon-containing fluid, preferably gaseous or vaporized desulfurized hydrocarbon-containing fluid, and sulfurized sorbent composition can be accomplished by any manner or method(s) known in the art that can separate a solid from a gas. Examples of such means are cyclonic devices, settling chambers, impingement devices for separating solids and gases, and the like and combinations thereof. The desulfurized hydrocarbon-containing fluid, preferably desulfurized gaseous cracked-gasoline or desulfurized gaseous diesel fuel, can then be recovered and preferably liquefied. Liquification of such desulfurized hydrocarbon-containing fluid can be accomplished by any manner or method(s) known in the art.

The hydrocarbon-containing fluid as described herein, preferably gaseous cracked-gasoline or gaseous diesel fuel, suitable as a feed in a process(es) of the present invention is a composition that comprises olefins, aromatics, sulfur, as well as paraffins and naphthenes.

The amount of olefins in gaseous cracked-gasoline is generally in the range of from about 10 to about 35 weight percent olefins based on the total weight of the gaseous cracked-gasoline. For diesel fuel there is essentially no olefin content.

The amount of aromatics in gaseous cracked-gasoline is generally in the range of from about 20 to about 40 weight percent aromatics based on the total weight of the gaseous cracked-gasoline. The amount of aromatics in gaseous diesel fuel is generally in the range of from about 10 to about 90 weight percent aromatics based on the total weight of the gaseous diesel fuel.

The amount of sulfur in the hydrocarbon-containing fluid, preferably cracked-gasoline or diesel fuel, suitable for use in a process(es) of the present invention can be in the range of from about 100 parts per million sulfur by weight of the cracked-gasoline to about 10,000 parts per million sulfur by weight of the cracked-gasoline and from about 100 parts per million sulfur by weight of the diesel fuel to about 50,000 parts per million sulfur by weight of the diesel fuel prior to the treatment of such hydrocarbon-containing fluid(s) with a desulfurization process(es) of the present invention.

The amount of sulfur in the desulfurized hydrocarbon-containing fluid, such as desulfurized cracked-gasoline or desulfurized diesel fuel, following treatment in accordance with a desulfurization process(es) of the present invention is less than about 100 parts per million (ppm) sulfur by weight of hydrocarbon-containing fluid, preferably less than about 90 ppm sulfur by weight of hydrocarbon-containing fluid, and more preferably less than about 80 ppm sulfur by weight of hydrocarbon-containing fluid.

In carrying out a process(es) of the present invention, if desired, a stripper zone can be inserted before and/or after the regeneration of the sulfurized sorbent composition. Such stripper zone, preferably utilizing a stripping agent, will serve to remove a portion, preferably all, of any hydrocarbon(s) from the sulfurized sorbent composition. Such stripper zone can also serve to remove oxygen and sulfur dioxide from the system prior to introduction of the regenerated sorbent composition into the activation zone. Such stripping employs a set of conditions that includes total pressure, temperature, and stripping agent partial pressure.

Preferably, the stripping, when employed, is carried out at a total pressure in the range of from about 25 pounds per square inch absolute (psia) to about 500 psia. The temperature for such stripping can be in the range of from about 100° F. to about 1000° F. Such stripping is carried out for a time sufficient to achieve the desired level of stripping. Such stripping can generally be achieved in a time period in the range of from about 0.1 hour to about 4 hours, preferably in the range of from about 0.3 hour to about 1 hour.

The stripping agent is a composition(s) that helps to remove a hydrocarbon(s) from the sulfurized sorbent composition. Preferably, the stripping agent is nitrogen.

The regeneration is carried out at a set of conditions that includes total pressure and sulfur removing agent partial pressure. Total pressure is generally in the range of from about 25 pounds per square inch absolute (psia) to about 500 psia.

The sulfur removing agent partial pressure is generally in the range of from about 1 percent to about 100 percent of the total pressure.

The sulfur removing agent is a composition that helps to generate gaseous sulfur-containing compounds and oxygen-containing compounds such as sulfur dioxide, as well as to burn off any remaining hydrocarbon deposits that might be present. The preferred sulfur removing agent suitable for use in the sorbent regeneration zone is oxygen or an oxygen-containing gas(es) such as air. Such regeneration is carried out for a time sufficient to achieve the desired level of regeneration. Such regeneration can generally be achieved in a time period in the range of from about 0.1 hour to about 24 hours, preferably in the range of from about 0.5 hour to about 3 hours.

The regeneration is carried out at a temperature generally in the range of from about 100° F. to about 1500° F., preferably in the range of from about 800° F. to about 1200° F.

The desulfurized sorbent composition is then reduced in an activation zone with a reducing agent, preferably hydrogen, so that at least a portion of the promoter component, preferably comprising nickel, distributed as a skin on the sorbent composition is reduced to thereby provide a sorbent composition having a reduced-valence promoter component, preferably reduced nickel. Such sorbent composition has a reduced-valence promoter component, preferably reduced nickel, distributed as a skin on such sorbent composition in an amount that provides for the removal of sulfur from a hydrocarbon-containing fluid such as cracked-gasoline or diesel fuel according to the inventive process(es) disclosed herein.

In general, when practicing a process(es) of the present invention, the activation, i.e., reduction, of the regenerated, desulfurized sorbent composition is carried out at a temperature in the range of from about 100° F. to about 1500° F. and at a pressure in the range of from about 15 pounds per square inch absolute (psia) to about 1500 psia. Such reduction is carried out for a time sufficient to achieve the desired level of promoter component reduction. Such reduction can generally be achieved in a time period in the range of from about 0.01 hour to about 20 hours.

Following the activation, i.e., reduction, of the regenerated, desulfurized sorbent composition, at least a portion of the resulting activated (i.e., reduced) sorbent composition can be returned to the desulfurization zone.

When carrying out a process(es) of the present invention, the steps of desulfurization, regeneration, activation (i.e., reduction), and optionally stripping before and/or after such regeneration, can be accomplished in a single zone or vessel or in multiple zones or vessels.

When carrying out a process(es) of the present invention in a fixed bed reactor system, the steps of desulfurization, regeneration, activation, and optionally stripping before and/or after such regeneration, are accomplished in a single zone or vessel.

When carrying out a process(es) of the present invention in a fluidized bed reactor system, the steps of desulfurization, regeneration, activation, and optionally stripping before and/or after such regeneration, are accomplished in multiple zones or vessels.

When a desulfurized hydrocarbon-containing fluid resulting from the practice of the present invention is a desulfurized cracked-gasoline, such desulfurized cracked-gasoline can be used in the formulation of gasoline blends to provide gasoline products suitable for commercial consumption and can also be used where a cracked-gasoline containing low levels of sulfur is desired.

When a desulfurized hydrocarbon-containing fluid resulting from the practice of the present invention is a desulfurized diesel fuel, such desulfurized diesel fuel can be used in the formulation of diesel fuel blends to provide diesel fuel products suitable for commercial consumption and can also be used where a diesel fuel containing low levels of sulfur is desired.

The following examples are presented to further illustrate this invention and are not to be construed as unduly limiting the scope of this invention.

EXAMPLE 1

Base Sorbent Material

A 20.02 pound quantity of diatomite silica was mixed with a 23.65 pound quantity of Nyacol AL-20 alumina solution in a mix-Muller. Such alumina solution was added to the mix-Muller over a period of about 15 minutes. While mixing, a 25.03 pound quantity of dry zinc oxide powder was then added to the above mixture and further mixed for about 30 minutes to form an extrudable paste. Such extrudable paste was then extruded through a laboratory 2-inch Bonnot extruder employing a ⅜-inch thick die containing ⅛-inch holes. The wet extrudate was then dried at 300° F. overnight (i.e., about 16 hours) and then calcined at 1175° F. for 1 hour to thereby provide a base sorbent material. A representative sample of the base sorbent material consisted of particulates with each particulate having a length of about ⅛ inch to about ¼ inch and a diameter of about ⅛ inch.

Control Sorbent A

A 25 pound quantity of the above-described particulated base sorbent material was impregnated with a solution of 13.62 pounds of nickel nitrate hexahydrate $(Ni(NO_3)_2 \cdot 6H_2O)$ dissolved in 2.18 pounds of deionized water in the following manner. The nickel nitrate hexahydrate solution was heated on a hot plate to aid in the dissolving of the nickel nitrate hexahydrate. The impregnation of the particulated base sorbent material was then conducted using a spray impregnation technique which consisted of utilizing an ultrasonic spray nozzle to spray the nickel solution onto the particulated base sorbent material while the particulated base sorbent material was being tumbled in a rotary coater. The resulting material was then dried at 300° F. overnight (i.e., about 16 hours) and then calcined at 1175° F. for 1 hour to thereby provide a nickel-containing spray impregnated particulated material containing about 11 weight percent nickel based on the total weight of the material. A 453.6 gram quantity of such nickel-containing spray impregnated particulated material was then impregnated with a solution of 157.22 grams of nickel nitrate hexahydrate and 31.8 grams of deionized water using a spray impregnation technique utilizing an ultrasonic spray nozzle.

The resulting twice nickel impregnated particulated material was then placed in an oven and dried at a temperature of 302° F. for 1 hour. The temperature was then increased to 1175° F. and maintained at 1175° F. for 1 hour to thereby obtain a 490 gram quantity of twice nickel impregnated particulated material containing about 18 weight percent nickel based on the total weight of the material.

Such twice nickel impregnated particulated material was then impregnated with a solution of 89.8 grams of nickel nitrate hexahydrate and 25 grams of deionized water. The impregnation was conducted using a spray impregnation technique utilizing an ultrasonic spray nozzle. The resulting material was then placed in an oven and dried at 302° F. for 1 hour. The temperature was then increased to 1175° F. and then maintained at 1175° F. for 1 hour to thereby provide Control Sorbent A. Control Sorbent A contained about 22 weight percent nickel based on the total weight of the material.

Scanning Electron Microprobe (SEM) analysis of three representative sample particulates of Control Sorbent A revealed that the zinc and nickel were uniformly distributed throughout each particulate.

Invention Sorbent B

A mixture of melted nickel nitrate hexahydrate $(Ni(NO_3)_2 \cdot 6H_2O)$ and water was prepared by mixing 13.61 pounds of nickel nitrate hexahydrate and 1.7 pounds of deionized water and heating such mixture in an oven at 200° F. for about 1 hour until the nickel nitrate hexahydrate melted to a point that the mixture of melted nickel nitrate hexahydrate and deionized water became viscous enough to pour. A 25 pound quantity of the above-described particulated base sorbent material was then heated at 250° F. for about 1 hour in an oven and then placed in a rotary coater. The mixture of melted nickel nitrate hexahydrate and water was then contacted with the surface of the heated particulated base sorbent material in the rotary coater by pumping the mixture of melted nickel nitrate hexahydrate and water through a plastic tubing, having a diameter of about ¼ inch, onto the surface of the heated particulated base sorbent material. It was observed that the nickel did not absorb into the material, but crystallized on the surface. The resulting material was then dried at 250° F. for 1 hour and then calcined at 1175° F. for 1 hour. Invention Sorbent B contained about 11 weight percent nickel based on the total weight of Invention Sorbent B.

Scanning Electron Microprobe (SEM) analysis of three representative sample particulates of Invention Sorbent B revealed that the zinc was uniformly distributed throughout the particulate whereas the nickel was concentrated as a skin near the surface of the particulate (particulate 1: essentially all nickel concentrated within 600 micrometers of the surface; particulate 2: essentially all nickel concentrated within 200 micrometers of the surface; and particulate 3: essentially all nickel concentrated within 200 micrometers of the surface).

Invention Sorbent C

A 226.8 gram quantity of the above-described particulated base sorbent material was heated at 250° F. for about 1 hour in an oven. The thus-heated particulated base sorbent material was then placed in a 1000 mL beaker in a heat mantel where the heat was maintained at approximately 250° F. A 123.5 gram quantity of powdered nickel nitrate hexahydrate $(Ni(NO_3)_2 \cdot 6H_2O)$, sized 250 to 300 mesh, was then slowly added to the heated particulated base sorbent material under stirring to thereby contact the heated particulated base sorbent material with the powdered nickel nitrate hexahydrate. Towards the end of the nickel nitrate hexahydrate addition, a heat gun was used to dry any excess moisture off of the material. The resulting material was then placed in an oven and dried at 302° F. for about 1 hour. The temperature was then increased to 1175° F. and maintained at 1175° F. for a period of 1 hour to thereby provide Invention Sorbent C. Invention Sorbent C contained about 11 weight percent nickel based on the total weight of Invention Sorbent C.

Scanning Electron Microprobe (SEM) analysis of three representative sample particulates of Invention Sorbent C revealed that the zinc was uniformly distributed throughout the particulates whereas the nickel was concentrated as a skin near the surface of the particulates (particulate 1: essentially all nickel concentrated within 250 micrometers of the surface; particulate 2: essentially all nickel concentrated within 200 micrometers of the surface; and particulate 3: essentially all nickel concentrated within 375 micrometers of the surface).

EXAMPLE II

This example illustrates the performance of Control Sorbent A and Invention Sorbent B described herein in Example I in a desulfurization process.

Ten grams of Control Sorbent A were placed in a ½-inch diameter stainless steel tube having a length of about 12 inches. The bottom of the tube was packed with aluminum pellets (obtained from Norton Chemical under the designation R-268) to provide a inert support for the bed of sorbent which was placed in the middle of the tube. Aluminum was also placed on top of the sorbent bed.

During each cycle, gaseous cracked-gasoline was pumped downwardly through the reactor at a rate of 13.4 milliliters per hour (mL/hr). The gaseous cracked-gasoline had a motor octane number (MON) of 80, an olefin content of 24.9 weight percent, 340 parts per million sulfur by weight sulfur-containing compounds based on the total weight of the gaseous cracked-gasoline, and about 95 weight percent thiophenic compounds (such as, for example, alkyl benzothiophenes, alkyl thiophenes, benzothiophenes and thiophenes) based on the weight of sulfur-containing compounds in the gaseous cracked-gasoline.

During each cycle, the reactor was maintained at a temperature of 700° F. and a pressure of 15 pounds per square inch absolute (psia). Hydrogen flow was at 150 standard cubic centimeters per minute (sccm) diluted with 150 sccm of nitrogen.

Before Cycle 1 was initiated, Control Sorbent A was reduced with hydrogen flowing at a rate of 300 sccm at a temperature of 700° F. for a period of one hour. Each cycle consisted of four hours with the product sulfur (ppm) for each cycle being measured at one hour intervals over each four-hour cycle period. After each cycle, Control Sorbent A was regenerated at 900° F. for one hour with a mixture of oxygen and nitrogen containing four volume percent oxygen (i.e., regeneration), then purged with nitrogen, and then reduced in hydrogen flowing at a rate of 300 sccm for one hour at 700° F. (i.e., activation). Control Sorbent A was tested over four cycles.

The above-described testing procedure was then repeated in the same manner with the exception that Invention Sorbent B was used in place of Control Sorbent A. Also, Invention Sorbent B was tested over a period of three cycles instead of four.

The results of the test are shown below in Table I.

TABLE I

| | Control Sorbent A (22% Nickel; Uniform Distribution) | | | | Invention Sorbent B (11% Nickel; Skin Distribution) | | |
|---|---|---|---|---|---|---|---|
| TOS[1] | Cycle 1 | Cycle 2 | Cycle 3 | Cycle 4 | Cycle 1 | Cycle 2 | Cycle 3 |
| | SULFUR (ppm) IN THE PRODUCT | | | | SULFUR (ppm) IN THE PRODUCT | | |
| 1 hr | 40 | 20 | 25 | 45 | 5 | 15 | 10 |
| 2 hr | 30 | 30 | 40 | 45 | 5 | 20 | 20 |
| 3 hr | 30 | 35 | 45 | 50 | 5 | 20 | 20 |
| 4 hr | 30 | 35 | 45 | 50 | 5 | 30 | 25 |

[1]TOS denotes Time on Stream in hours

Test data in Table I clearly demonstrate that use of a sorbent composition of the present invention to remove sulfur from cracked-gasoline containing 340 parts per million sulfur by weight sulfur-containing compounds based on the total weight of the cracked-gasoline results in a significant reduction of the sulfur content of such cracked-gasoline, generally to a level of about 5 to 30 parts per million sulfur.

The test data in Table I further demonstrate that a sorbent composition containing 11 weight percent nickel distributed as a skin on the sorbent composition prepared according to a process of the present invention which utilized a melting technique and very little water desulfurized the cracked-gasoline significantly better than a sorbent composition containing twice as much nickel (22 weight percent) prepared using a spray impregnation technique which utilized a substantial quantity of water.

The results shown in the above examples clearly demonstrate that the present invention is well adapted to carry out the objects and attain the ends and advantages mentioned as well as those inherent therein.

Reasonable variations, modifications, and adaptions can be made within the scope of the disclosure and the appended claims without departing from the scope of this invention.

What is claimed is:

1. A process of making a sorbent composition comprising:
   impregnating a support component with a promoter component wherein said promoter component has been melted under a melting condition comprising:
   a temperature in the range of from the melting point of said melted promoter component to below the decomposition temperature of said melted promoter component,
   a time period in the range of from about 1 minute to about 2 hours, and
   a pressure in the range of from about atmospheric to about 150 psia.

2. A process according to claim 1 wherein said impregnating comprises:
   mixing a solid promoter component with said support component to thereby provide a mixture of said solid promoter component and support component, and
   subjecting said mixture to said melting condition to thereby provide a support component having substantially all of the surface area contacted with said promoter component.

3. A process according to claim 2 wherein said mixture is under constant stirring or tumbling.

4. A process according to claim 1 wherein said impregnating comprises:
   pre-heating said support component under a heating condition to thereby provide a pre-heated support component, and contacting said pre-heated support component with a solid promoter component to thereby provide a support component having substantially all of the surface area contacted with said promoter component.

5. A process according to claim 4 wherein said heating condition comprises:
a temperature in the range of from about 175° F. to about 300° F.,
a time period in the range of from about 1 minute to about 2 hours, and
a pressure in the range of from about atmospheric to about 150 psia; and further wherein said support component is under constant stirring or tumbling.

6. A process according to claim 1 wherein said impregnating comprises:
subjecting a solid promoter component to said melting condition to thereby provide a melted promoter component, and
adding said melted promoter component to said support component by pouring said melted promoter component onto the surface of said support component to thereby provide a support component having substantially all of the surface area of said support component contacted with said melted promoter component.

7. A process according to claim 6 wherein said melted promoter component is poured onto the surface of said support component while said support component is under constant stirring or tumbling.

8. A process according to claim 7 wherein said support component is pre-heated under a heating condition before said support component is contacted with said melted promoter component and further wherein said heating condition comprises:
a temperature in the range of from about 175° F. to about 300° F.,
a time period in the range of from about 1 minute to about 2 hours, and
a pressure in the range of from about atmospheric to about 150 psia.

9. A process according to claim 1 wherein said support component comprises components selected from the group consisting of zinc oxide, inorganic carriers, organic carriers, and combinations thereof.

10. A process according to claim 1 wherein said support component comprises zinc oxide, silica, and alumina.

11. A process according to claim 10 wherein said zinc oxide comprises powdered zinc oxide or one or more zinc compounds that are convertible to zinc oxide.

12. A process according to claim 10 wherein said silica is selected from the group consisting of diatomite, silicalite, silica colloid, flame-hydrolyzed silica, hydrolyzed silica, silica gel, precipitated silica, silicon compounds, and combinations thereof and further wherein said silicon compounds are selected from the group consisting of silicic acid, sodium silicate, ammonium silicate, and combinations thereof.

13. A process according to claim 10 wherein said silica is diatomite.

14. A process according to claim 10 wherein said alumina is selected from the group consisting of colloidal alumina solutions and alumina compounds produced by the dehydration of alumina hydrates.

15. A process according to claim 1 wherein said promoter component is selected from the group consisting of metals, metal oxides, and combinations thereof.

16. A process according to claim 15 wherein said metals are selected from the group consisting of cobalt, nickel, iron, manganese, copper, zinc, molybdenum, tungsten, silver, tin, vanadium, antimony, and combinations thereof.

17. A process according to claim 16 wherein said metal oxides are selected from the group consisting of cobalt oxides, nickel oxides, iron oxides, manganese oxides, copper oxides, zinc oxides, molybdenum oxides, tungsten oxides, silver oxides, tin oxides, vanadium oxides, antimony oxides, and combinations thereof.

18. A process according to claim 17 wherein said metals are in a form selected from the group consisting of metal acetates, metal carbonates, metal nitrates, metal sulfates, metal thiocyanates, and combinations thereof.

19. A process according to claim 1 wherein said promoter component is selected from the group consisting of nickel, cobalt, and combinations thereof.

20. A process according to claim 1 wherein said promoter component is nickel.

21. A process according to claim 1 wherein said promoter component comprises a precursor of a nickel oxide.

22. A process according to claim 1 wherein said promoter component comprises nickel nitrate hexahydrate.

23. A process according to claim 1 wherein said support component comprises: zinc oxide in an amount in the range of from about 10 to about 90 weight percent zinc oxide based on the total weight of said sorbent composition, silica in an amount in the range of from about 5 to about 85 weight percent silica based on the total weight of said sorbent composition, and alumina in an amount in the range of from about 5 to about 30 weight percent alumina based on the total weight of said sorbent composition.

24. A process according to claim 1 wherein said promoter component is present in said sorbent composition in an amount in the range of from about 5 to about 50 weight percent promoter component based on the total weight of said sorbent composition.

25. A process according to claim 1 wherein said promoter component comprises a bimetallic promoter component wherein said bimetallic promoter component comprises nickel and cobalt in a weight ratio in the range of from about 20:1 to about 1:20.

26. A process according to claim 1 wherein said promoter component is present as a skin on said support component.

27. A process according to claim 26 wherein the thickness of said skin is in the range of from about 1 micron to about 400 microns.

28. A process according to claim 1 wherein said temperature of said melting condition is in the range of from about 75° F. to about 700° F.

29. A process according to claim 1 further comprising, after said impregnating, drying under a drying condition wherein said drying condition comprises: a temperature in the range of from about 180° F. to about 290° F., a time period in the range of from about 0.5 hour to about 60 hours, and a pressure in the range of from about atmospheric to about 150 psia; and, after said drying, calcining under a calcining condition wherein said calcining condition comprises: a temperature in the range of from about 400° F. to about 1800° F., a pressure in the range of from about 7 psia to about 750 psia, and a time period in the range of from about 1 hour to about 60 hours.

30. A process according to claim 29 further comprising reducing with a reducing agent to thereby provide a sorbent composition having a reduced-valence promoter component and further wherein said reduced-valence promoter component is present in an amount in the range of from about 5 to about 50 weight percent of the total weight of said sorbent composition.

31. A process according to claim 30 wherein said reducing agent is hydrogen.

32. A process according to claim 30 wherein said reduced-valence promoter component is reduced nickel.

33. A process according to claim 1 wherein said support component comprises zinc oxide, silica, and alumina and wherein said zinc oxide, silica, and alumina are subjected to mixing to thereby provide a resulting mixture.

34. A process according to claim 33 wherein said resulting mixture is shaped to form a particulate.

35. A process according to claim 34 wherein said particulate has a diameter in the range of from about 1/32 inch to 1/2 inch and a length in the range of from about 1/8 inch to about 1 inch.

36. A process according to claim 34 further comprising, before said impregnating, drying said particulate under a drying condition wherein said drying condition comprises: a temperature in the range of from about 180° F. to about 290° F., a time period in the range of from about 0.5 hour to about 60 hours, and a pressure in the range of from about atmospheric to about 150 psia; and, after said drying of said particulate, calcining said dried particulate under a calcining condition wherein said calcining condition comprises: a temperature in the range of from about 400° F. to about 1800° F., a pressure in the range of from about 7 psia to about 750 psia, and a time period in the range of from about 1 hour to about 60 hours.

37. A composition prepared by the process of claim 1.

38. A composition prepared by the process of claim 2.

39. A composition prepared by the process of claim 4.

40. A composition prepared by the process of claim 6.

41. A composition prepared by the process of claim 10.

42. A composition prepared by the process of claim 15.

43. A composition prepared by the process of claim 19.

44. A composition prepared by the process of claim 20.

45. A composition prepared by the process of claim 26.

46. A sorbent composition comprising a support component and a promoter component wherein said promoter component is present as a skin on said support component wherein said skin is the result of impregnating said support component with said promoter component while said promoter component was in a melted state.

47. A sorbent composition according to claim 46 wherein said support component comprises zinc oxide, silica, and alumina.

48. A sorbent composition according to claim 47 wherein said promoter component is selected from the group consisting of metals, metal oxides and combinations thereof.

49. A sorbent composition according to claim 48 wherein said metals are selected from the group consisting of cobalt, nickel, iron, manganese, copper, zinc, in olybdenum, tungsten, silver, tin, vanadium, antimony, and combinations thereof.

50. A sorbent composition according to claim 49 wherein said metal oxides are selected from the group consisting of cobalt oxides, nickel oxides, iron oxides, manganese oxides, copper oxides, zinc oxides, molybdenum oxides, tungsten oxides, silver oxides, tin oxides, vanadium oxides, antimony oxides, and combinations thereof.

51. A sorbent composition according to claim 50 wherein said promoter component is nickel.

52. A sorbent composition according to claim 46 wherein said support component comprises: zinc oxide in an amount in the range of from about 10 to about 90 weight percent zinc oxide based on the total weight of said sorbent composition, silica in an amount in the range of from about 5 to about 85 weight percent silica based on the total weight of said sorbent composition, and alumina in an amount in the range of from about 5 to about 30 weight percent alumina based on the total weight of said sorbent composition.

53. A sorbent composition according to claim 46 wherein said promoter component is present in said sorbent composition in an amount in the range of from about 5 to about 50 weight percent promoter component based on the total weight of said sorbent composition.

54. A sorbent composition according to claim 46 wherein said promoter component comprises a bimetallic promoter component wherein said bimetallic promoter component comprises nickel and cobalt in a weight ratio in the range of from about 20:1 to about 1:20.

55. A sorbent composition according to claim 46 wherein the thickness of said skin is in the range of from about 1 micron to about 400 microns.

56. A sorbent composition according to claim 46 wherein said sorbent composition has been dried under a drying condition and then calcined under a calcining condition and wherein said drying condition comprises: a temperature in the range of from about 180° F. to about 290° F., a time period in the range of from about 0.5 hour to about 60 hours, and a pressure in the range of from about atmospheric to about 150 psia; and, said calcining condition comprises: a temperature in the range of from about 400° F. to about 1800° F., a pressure in the range of from about 7 psia to about 750 psia, and a time period in the range of from about 1 hour to about 60 hours.

57. A sorbent composition according to claim 56 wherein said sorbent composition has been reduced with a reducing agent to thereby provide a sorbent composition having a reduced-valence promoter component and further wherein said reduced-valence promoter component is present in an amount in the range of from about 5 to about 50 weight percent of the total weight of said sorbent composition.

58. A sorbent composition according to claim 57 wherein said reducing agent is hydrogen.

59. A sorbent composition according to claim 57 wherein said reduced-valence promoter component is reduced nickel.

60. A sorbent composition according to claim 46 wherein said support component is in the form of a particulate.

61. A sorbent composition according to claim 60 wherein said particulate has been dried under a drying condition and then calcined under a calcining condition and further wherein said drying condition comprises: a temperature in the range of from about 180° F. to about 290° F., a time period in the range of from about 0.5 hour to about 60 hours, and a pressure in the range of from about atmospheric to about 150 psia; and, said calcining condition comprises: a temperature in the range of from about 400° F. to about 1800° F., a pressure in the range of from about 7 psia to about 750 psia, and a time period in the range of from about 1 hour to about 60 hours.

62. A sorbent composition comprising:
a) support component which comprises zinc oxide and an organic or inorganic carrier and
b) a promoter component selected from the group consisting of metals, metal oxides and mixtures thereof,
wherein said promoter component is present in a reduced valence state and in an amount which effects the removal of organosulfur from a hydrocarbon fluid.

63. A sorbent composition according to claim 62 wherein said support component comprises zinc oxide, silica and alumina.

64. A sorbent composition according to claim 63 wherein at least a portion of said alumina is converted to an aluminate.

65. A sorbent composition according to claim 63 wherein said support component is calcined to convert at least a portion of said alumina to an aluminate.

66. A sorbent composition according to claim 62 wherein promoter component is present in said composition in an amount within a range of from about 5 to about 50 weight percent promoter component, based on the total weight of said sorbent composition.

67. A sorbent composition according to claim 62 wherein said metals are selected from the group consisting of cobalt, nickel, iron, manganese, copper, zinc, molybdenum, tungsten, silver, tin, vanadium, antimony and combinations thereof.

68. A sorbent composition according to claim 62 wherein metal oxides are selected from the group consisting of cobalt oxides, nickel oxides, iron oxides, manganese oxides, copper oxides, zinc oxides, molybdenum oxides, tungsten oxides, silver oxides, tin oxides, vanadium oxides, antimony oxides and combinations thereof.

69. A sorbent composition according to claim 68 wherein said metal is manganese.

70. A sorbent composition according to claim 68 wherein said metal is molybdenum.

71. A sorbent composition according to claim 62 wherein said hydrocarbon fluid is a gas, liquid, vapor or mixtures thereof.

72. A sorbent composition according to claim 62 wherein said hydrocarbon fluid is gasoline.

73. A sorbent composition according to claim 72 wherein said hydrocarbon fluid is cracked gasoline.

74. A sorbent composition according to claim 62 wherein said hydrocarbon fluid is diesel fuel.

75. A process for the production of a sorbent composition suitable for the removal of sulfur from a hydrocarbon fluid which comprises:

a) impregnating a support component which comprises zinc oxide and an organic or inorganic carrier with a melted promoter component selected from the group consisting of metals, metal oxides and mixtures thereof to form a mixture;

b) drying the impregnated mixture of step (a);

c) calcining the dried mixture of step (b); and thereafter d) reducing the resulting calcined mixture of step (c) with a suitable reducing agent under suitable conditions to produce a sorbent composition such that said promoter component is present in a reduced valence state and in an amount which effects the removal of organosulfur from a hydrocarbon fluid.

76. A process according to claim 75 wherein said support component comprises zinc oxide, silica and alumina.

77. A process according to claim 76 wherein at least a portion of said alumina is converted to an aluminate.

78. A process according to claim 76 wherein promoter component is present in said composition in an amount within a range of from about 5 to about 50 weight percent promoter component, based on the total weight of said sorbent composition.

79. A process according to claim 75 wherein said metals are selected from the group consisting of cobalt, nickel, iron, manganese, copper, zinc, molybdenum, tungsten, silver, tin, vanadium, antimony and combinations thereof.

80. A process according to claim 75 wherein metal oxides are selected from the group consisting of cobalt oxides, nickel oxides, iron oxides, manganese oxides, copper oxides, zinc oxides, molybdenum oxides, tungsten oxides, silver oxides, tin oxides, vanadium oxides, antimony oxides and combinations thereof.

81. A process according to claim 80 wherein said metal is manganese.

82. A process according to claim 80 wherein said metal is molybdenum.

83. A process according to claim 75 wherein said hydrocarbon fluid is a gas, liquid, vapor or mixtures thereof.

84. A process according to claim 75 wherein said hydrocarbon fluid is gasoline.

85. A process according to claim 84 wherein said hydrocarbon fluid is cracked gasoline.

86. A process according to claim 75 wherein said hydrocarbon fluid is diesel fuel.

* * * * *

UNITED STATES PATENT AND TRADEMARK OFFICE
CERTIFICATE OF CORRECTION

PATENT NO. : 6,683,024 B1
DATED : January 27, 2004
INVENTOR(S) : Gyanesh P. Khare and Donald R. Engelbert It is certified that error appears in the above-identified patent and that said Letters Patent is hereby corrected as shown below:

<u>Column 25,</u>
Line 51, delete "in olybdenum" and insert therefor -- molybdenum --.

Signed and Sealed this

Fifteenth Day of June, 2004

JON W. DUDAS
*Acting Director of the United States Patent and Trademark Office*